Figure 1:
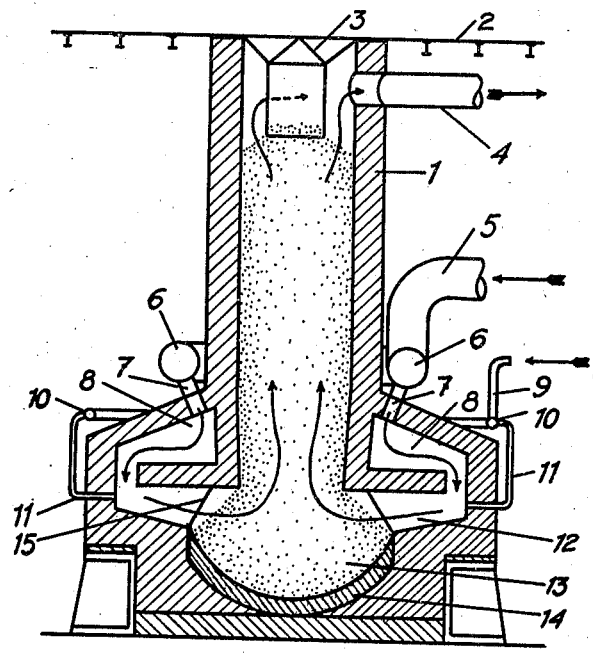

March 15, 1932. E. A. A. GRÖNWALL ET AL. 1,850,009
REDUCTION OF METALS OUT OF THEIR ORES
Filed Feb. 28, 1929 2 Sheets-Sheet 1

Inventors:
E. Assar A. Grönwall
Harry J. A. Nathorst.

Patented Mar. 15, 1932                                                                                      1,850,009

UNITED STATES PATENT OFFICE

EUGEN ASSAR ALEXIS GRÖNWALL AND HARRY JOHAN HJALMAR NATHORST, OF STOCKHOLM, SWEDEN

REDUCTION OF METALS OUT OF THEIR ORES

Application filed February 28, 1929, Serial No. 343,476, and in Sweden May 23, 1928.

This invention relates to an improved process for reducing metals out of their ores. When reducing iron ores in accordance with this invention, the metal may be obtained as iron sponge, pig-iron, steel or malleable iron. The process is also suitable for reducing out such other metals than iron that can be reduced out directly or indirectly by means of admixed carbon in the form of char-coal, coke, anthracite, peat-coal and the like.

The process is characterized therein that when reducing out metal in a shaft-furnace out of its ore by means of carbonaceous reducing agent, the combustible gases formed in the furnace during the reduction process are brought to circulate in the furnace, and that oxygen gas is blown into said circulating gases in such a quantity that such a part of said gases is combusted that the required reducing and melting heat is generated, whereupon the gases thus heated are led into the charge consisting of partly reduced ore and carbon in the lower part of the shaft-furnace.

By allowing a surplus of CO to circulate in the furnace, the combustion temperature and the heating temperature can be kept at the desired height. By blowing for instance 13,5 $O_2$ into 115 CO, a gas is obtained consisting of 88CO+27$CO_2$ at 1700° C. The theoretical course of reaction would in this case be the following:—

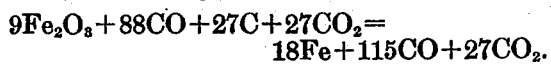

From the furnace 115CO+27$CO_2$ are led off, whereupon they are cooled and washed in a suitable way, and thereupon passed to a device for removing the content of $CO_2$. This may be effected by liquidifying or freezing after the Linde-method, by absorption in water under pressure, or by chemical absorption in alkali carbonate that is regenerated in a known way. The purified gas, now consisting of 115 CO, is sent back, cold or preheated, to the furnace and is there again partly combusted with 13,5 $O_2$, whereupon the above related course is repeated; that is, the gas is made to circulate. In the practise it is not necessary to wash out all $CO_2$. If an absorption of 85% $CO_2$ is considered satisfactory, an equilibrium will be reached when the gas consists of 115CO+4,75$CO_2$. By varying the quantity of circulating gas as well as the quantity of oxygen and carbon, the reducing and smelting temperatures can be varied; when smelting is not needed the reduction temperature alone can be varied. But it is also apparent that by a suitable proportioning between oxygen and carbon all the admixed carbon will be combusted or oxidized to carbon dioxide and that thus no excess of carbon monoxide will arise.

Figure 2:
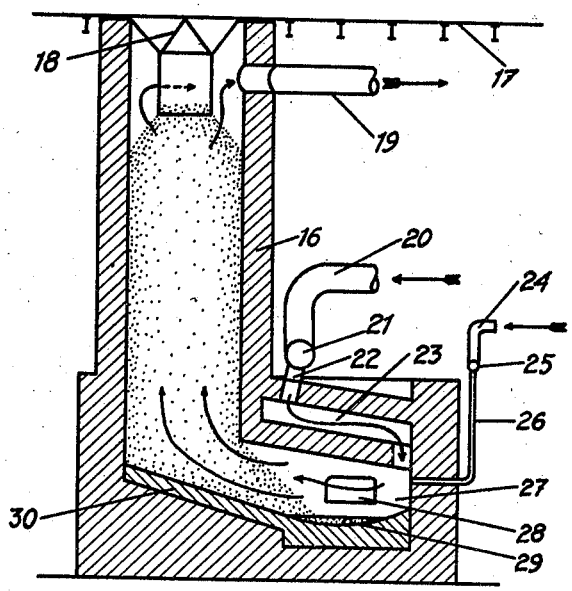
Figure 3:
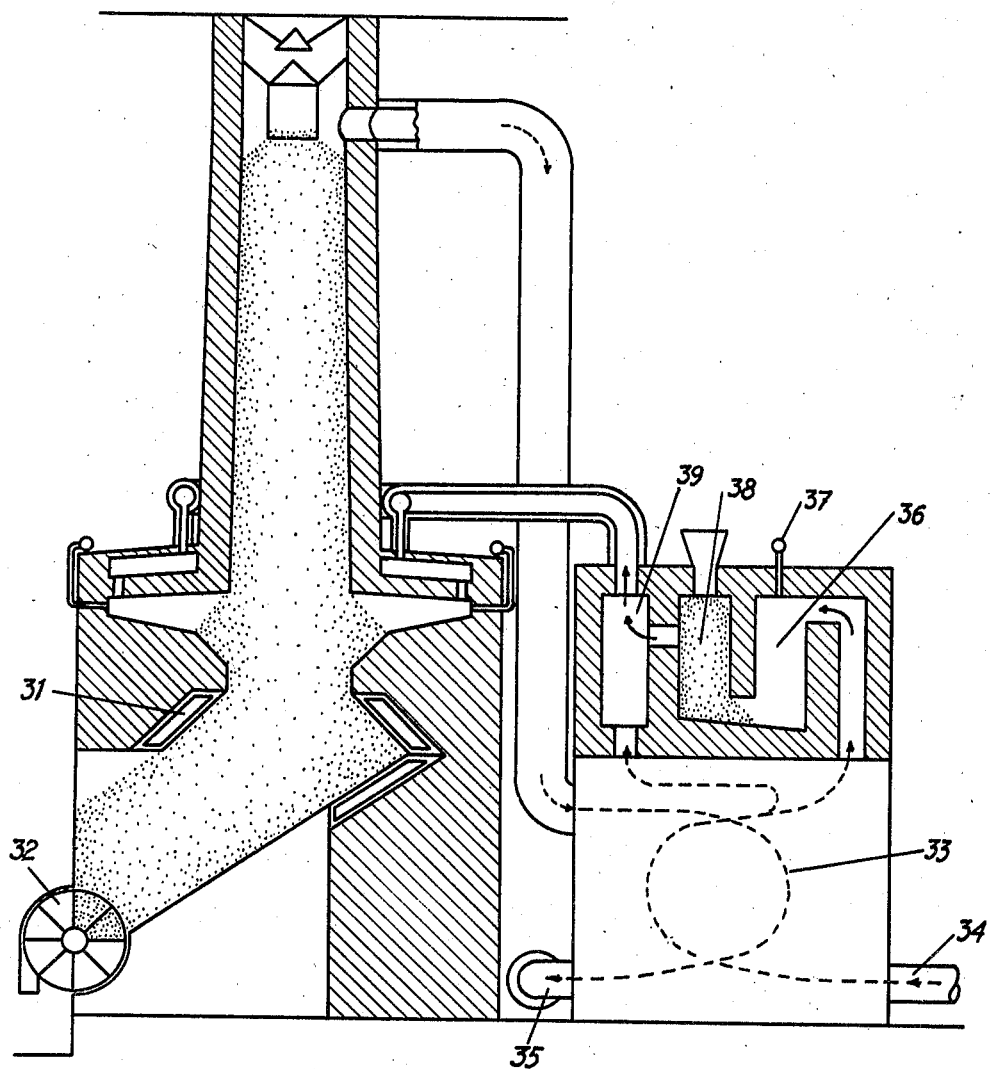

By way of example we have shown in the accompanying drawings in Figs. 1, 2 and 3 in longitudinal section three shaft furnaces that can be used for carrying out a reducing process in accordance with this invention.

According to Fig. 1, the furnace shaft is signified by the numeral 1. 2 is the charging floor, and 3 the charging throat. 4 is the escape pipe for the circulation gases. 5 is an inlet pipe for the circulation gases, and 6 a ring formed distribution pipe for the same. Said gas is blown through the pipes 7 into channels 8 in the lower part of the furnace, where the gas in a certain degree cools the lower part of the furnace walls and the underlying arch. 9 is an inlet pipe for oxygen connected with a ring pipe 10 that by means of pipes 11 communicates with the combustion room 12, into which the oxygen is blown and then mixed with the circulation gas, so that a corresponding part of the latter is combusted. 13 is the hearth and 14 its bottom. 15 signifies radially arranged partition walls that support the shaft and at the same time divide channels and combustion rooms in suitable sections. The hearth is as usual provided with tymp stone and hearth opening (not shown in Fig. 1).

Fig. 2 shows a section through a somewhat modified shaft furnace that is especially suitable for the production of steel or malleable iron, and also other metals. 16 is the shaft, 17 the charging floor, 18 the charging throat, 19 an outlet pipe for the circulation gases, 20 an inlet pipe for circulation gases, that communicate with a distribution pipe 21 for said gases, which through the branch pipes 22 are blown into the channel or channels 23 in the furnace, where they cool the lower part of the shaft walls and the underlying arch and at the same time get somewhat preheated. 24 is an inlet pipe for oxygen, communicating with a distribution pipe 25, from which the oxygen through branch pipes 26 is blown into the combustion and smelting room 27, suitably provided with an arched bottom. 28 is a door for smaller repairs, and 29 the tap hole for metal and slag. 30 is the bottom of the furnace, made out of highly refractory and slag-proof material, for example zirconium ore.

Fig. 3 illustrates a third form of shaft furnace that is especially suitable for the production of iron-sponge in accordance with the invention. In such a case it is suitable to let the circulation gases pass through a carburettor before reentering the furnace. In said carburettor a quantity of oxygen is blown into the circulation gases so that a part of them is combusted, whereupon the hot gases are led through a coal tower and from there back into the furnace as described above in connection with Figs. 1 and 2.

The lower part of the shaft is formed as a room, where the iron-sponge is cooled by means of water-cooled wall-plates 31. 32 is a device for feeding out the iron-sponge. The reduction furnace is connected by means of gas piping with a recuperator 33, in which the gases from the furnace give off a great part of their heat and are led away by the pipe 35. When the gases have been purified and liberated from $CO_2$, the same are brought to the recuperator through the pipe 34, and are preheated and thereupon led into the carburettor arranged thereabove, in whose combustion chamber 36 a part of the gases is combusted by oxygen blown in through the pipe 37. The gases thus heated are carburetted by leading them through the coal tower 38. In the chamber 39 the carburetted gas is mixed with a quantity of gas that is led into the chamber 39 directly from the recuperator 33. From the chamber 39 the gases are led back into the furnace, wherein a part of them is combusted by oxygen as described above.

In certain cases the charge will have a certain tendency of packing together or hanging, and brittle briquettes, especially briquettes with char-coal, will easily break too early by the pressure in the shaft. This can be avoided by giving the shaft a square or rectangular cross-section, and by arranging at suitable places in the shaft rotating or rotatable members in such a way that they partly neutralize the pressure of the pile of charging material and by their rotation prevent the material from hanging or being jammed during its passage down through the shaft. In this way the resistance against the flow of the heat delivering and partly reducing gases through the charge can be kept within reasonable limits. That sort of shaft is especially well adapted for the reduction of iron sponge, but also for other purposes. For charges of a more powdery consistence one may use a low shaft furnace combined in the known way with one or several horizontal and rotating preheating or reduction drums.

By correctly determining the proportions between carbon and ore, it is possible by the present invention to produce iron or steel with the approximate carbon content that is desired, but it is also possible to produce an iron sponge practically free from carbon.

The oxygen required for the process may be generated in several different ways. One way is using the Linde-process or modifications thereof, wherein the oxygen is obtained by rectifying liquid air. Another way is the electrolytic decomposition of water, also hydrogen then being obtained wherefore this method is best suitable when the hydrogen can be disposed of at such conditions that the oxygen is obtained at low cost. In cases when there is access to cheap electric power, and coal at the same time is expensive, the hydrogen—or at least a part thereof—may be blown into the surface and in such way reduce the carbon consumption.

Of the two named examples of oxygen generation the former is as a rule to be preferred on account of the low power consumption required.

The oxygen gas may be stored either in gas form or in a liquid state in suitable containers. In this way a reserve supply can be provided so that a shorter stop in the oxygen manufacture will have no influence upon the continual working of the furnace.

Compared with the common blast furnace, a shaft furnace working after the present method will offer a considerable saving of carbon that, however, in some degree is counteracted by a higher power consumption. Even in the case that the oxygen is generated out of liquid air produced by means of a machinery driven by steam or internal combustion engines, the total carbon consumption pr. ton iron or steel will be essentially lower. Since the oxygen is completely consumed before the hot gases enter the pile of charging material and a great surplus of CO exists, no oxidation of already reduced out metal can occur as in a common blast furnace.

Concerning direct production of steel or malleable iron the present method as compared with previously known electrothermic methods has the advantage of essentially lower power consumption and lower maximum temperature—thereby causing less strain to the furnace—a more even distribution of temperature in the smelting room, and a greater possibility of regulating the smelting temperature. The possibility of exact regulation of the reduction temperature is of a great value at the production of iron sponge.

We claim:—

1. Process for reducing metals in shaft furnaces out of their ores by means of carbonaceous reducing agents at 1700° C., comprising removing carbon dioxide out of gases escaping from the furnace, blowing the remaining gases back into the charge in the lower part of the shaft furnace, after having blown into the furnace such a quantity of oxygen gas that only a part of their content of combustible gases is combusted, and keeping the gases continually in circulation through the charge and furnace said oxygen gas being obtained by rectifying liquid air.

2. Process for reducing metals in shaft furnaces out of their ores by means of carbonaceous reducing agents at 1700° C. comprising removing carbon dioxide out of gases escaping from the furnace, blowing the remaining gases back into the charge in the lower part of the shaft furnace, after having blown into the furnace in a part of the furnace communicating with the smelting room such a quantity of oxygen gas that only a part of their content of combustible gases is combusted, and keeping the gases continually in circulation through the charge and furnace, said oxygen gas being obtained by rectifying liquid air.

3. Process for producing metals in shaft furnaces out of their ores by means of carbonaceous reducing agents at 1700° C., comprising removing carbon dixoide out of gases escaping from the furnace, combusting a part of said treated gases with oxygen, carburetting the gas mixture by leading it through coal, blowing the gases back into the charge in the lower part of the shaft furnace, after having blown into the furnace such a quantity of oxygen gas that only a part of their content of combustible gases is combusted, and keeping the gases continually in circulation through the charge and furnace, said oxygen gas being obtained by rectifying liquid air.

4. Process for reducing metals in shaft furnaces out of their ores by means of carbonaceous reducing agents, comprising removing carbon dioxide out of the gases formed during the reduction process and escaping from the furnace, forcing the remaining gases back into the charge in the lower part of the furnace after mixing said gases with such a quantity of oxygen gas that such a part of the combustible content of said gases is combusted that the required reducing and melting heat is generated, and keeping said gases continually in circulation through the charge and furnace.

5. Process for reducing metals in shaft furnaces out of their ores by means of carbonaceous reducing agents, comprising removing carbon dioxide out of the gases formed during the reduction process and escaping from the furnace, forcing the remaining gases back into the charge in the lower part of the shaft furnace after having blown into said gases contained in a part of the furnace communicating with the smelting room such a quantity of oxygen gas that only a part of their content of combustible gases is combusted, and keeping the gases continually in circulation through the charge and furnace.

6. Process for producing metals in shaft furnaces out of their ores by means of carbonaceous reducing agents, comprising removing carbon dioxide out of gases escaping from the furnace, combusting a part of said treated gases with oxygen, carburetting the gas mixture by leading it through hot coal, blowing the gases back into the charge in the lower part of the shaft furnace, after having blown into said gases such a quantity of oxygen gas that only a part of their content of combustible gases is combusted, and keeping the gases continually in circulation through the charge and furnace.

In testimony whereof we have hereunto set our hands.

EUGEN ASSAR ALEXIS GRÖNWALL.
HARRY JOHAN HJALMAR NATHORST.